June 17, 1924.
H. SCHNEIDER
1,497,741
FLUID OPERATED CHANGE SPEED GEAR
Filed Sept. 10, 1923     2 Sheets-Sheet 2
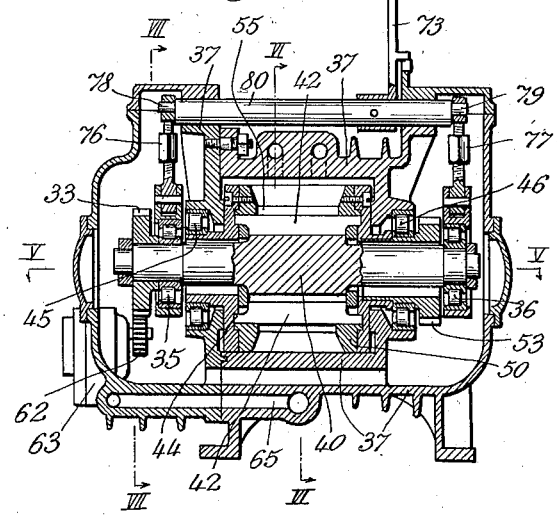
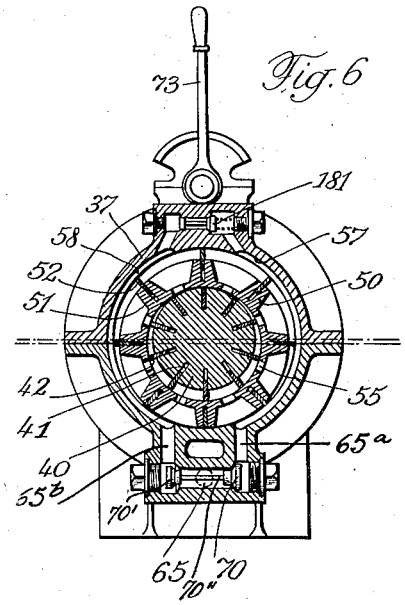
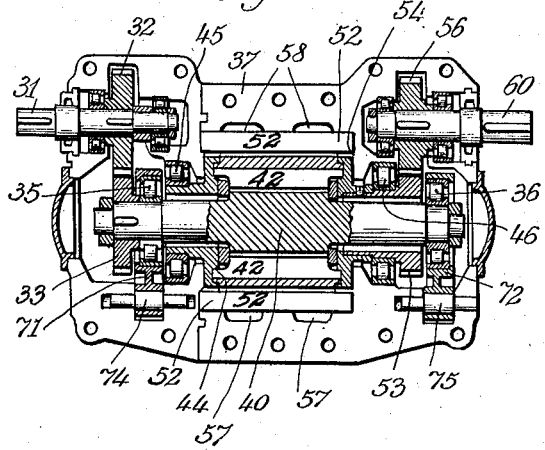
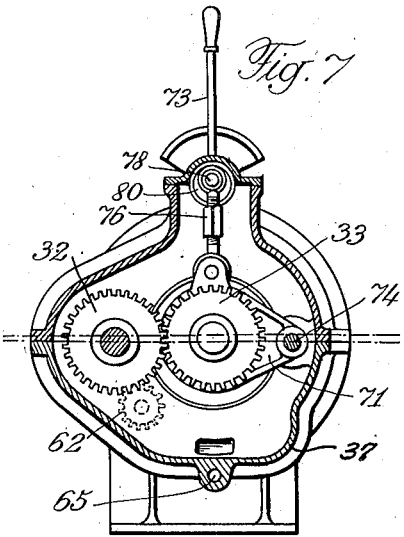
Inventor:
Heinrich Schneider Patented June 17, 1924.

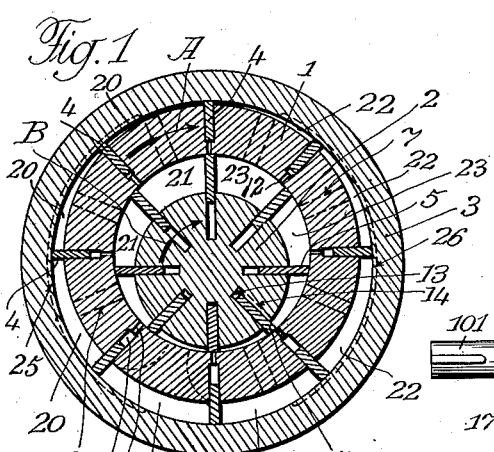
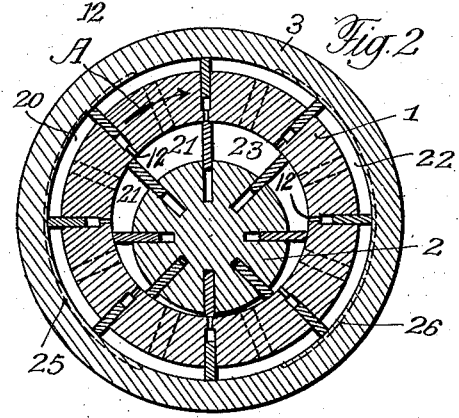
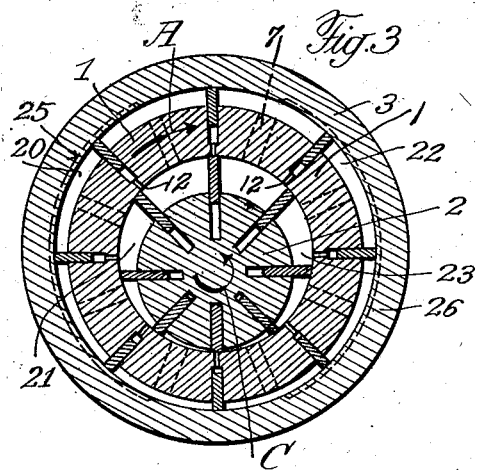
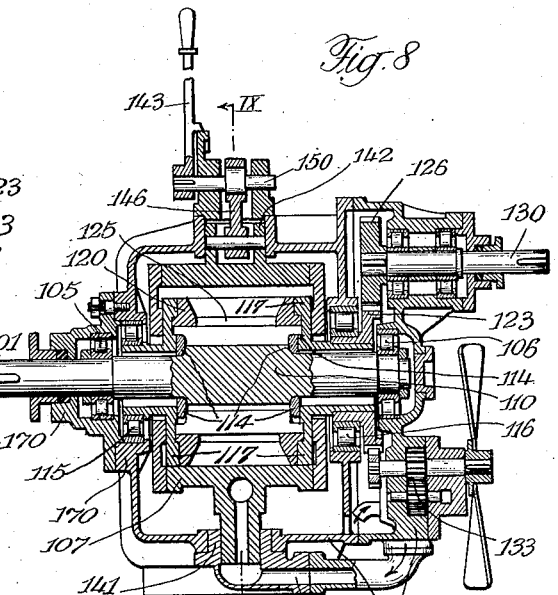
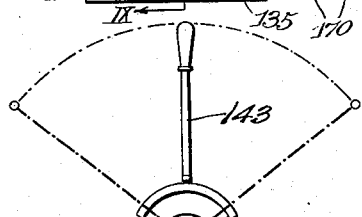
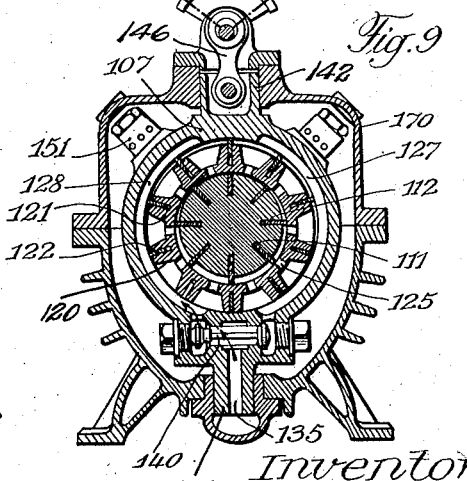

1,497,741

UNITED STATES PATENT OFFICE.

HEINRICH SCHNEIDER, OF ILLNAU, SWITZERLAND.

FLUID-OPERATED CHANGE-SPEED GEAR.

Application filed September 10, 1923. Serial No. 661,904.

*To all whom it may concern:*

Be it known that I, HEINRICH SCHNEIDER, a citizen of the Republic of Switzerland, residing at Illnau, Canton Zurich, Switzerland, have invented certain new and useful Improvements in Fluid-Operated Change-Speed Gears, of which the following is a specification, reference being had therein to the accompanying drawing.

The present invention relates to fluid operated change speed gears of the type in which any desirable speed ratio between a maximum speed and zero in both directions of rotation may be obtained.

The change speed gear according to the present invention comprises in combination two rotors of the rotary vane type one arranged eccentrically within the other, channels for directly connecting with each other the working spaces of the rotors, a casing enclosing said two rotors and eccentrically arranged to the outer rotor, and means to alter one of said eccentricities.

The change speed gear according to the present invention differs from the known gears inasmuch as there are no stationary machinery parts such as guide apparatus or controlling organs arranged between the two rotors and that the working spaces of the two rotors are directly connected to each other. In consequence thereof the connecting channels are shorter and the losses by friction, leakage and throttling are substantially lower than with known gears. The efficiency of the gears according to the present invention is therefore very high.

Constructional examples of the subject matter of the present invention are illustrated on the accompanying drawings in which:

Figs. 1-3 show in a diagrammatic manner the two rotary pumps of a gear, the change of speed and the reversing of the direction of rotation being effected by an alteration of the position of the casing of the gear relatively to the rotors, the relative position of the parts shown in Fig. 1 is so that both rotors rotate in the same direction, Fig. 2 shows the position in which the gear is inoperative and in the position illustrated in Fig. 3 the rotors rotate in directions that are opposite to each other.

Fig. 4 shows in a vertical longitudinal section, a first constructional example of a change speed gear.

Fig. 5 is a horizontal section along line V—V in Fig. 4.

Fig. 6 is a vertical section along line VI—VI in Fig. 4 and Fig. 7 is a section along line VII—VII in Fig. 4.

Fig. 8 is a longitudinal section through a second constructional example and

Fig. 9 is a section along line IX—IX of Fig. 8.

The rotors 1 and 2 are provided with vanes 4 and 5 respectively adapted to slide in radial slots 11 and 13 respectively. The rotor 1 is surrounded by the casing 3 and the rotor 2 is arranged within the rotor 1 and eccentrically to the latter. The working spaces 20 and 22 of the rotor 1 are in direct connection with the working spaces 21 and 23 of the rotor 2 by the channels 7.

The slots 11 of the rotor 1 are connected to the working spaces of the rotor 2 by means of bores 12; grooves 14 are provided in connection with the radial slots 13 of the rotor 2 so that the slots are always filled with the working fluid.

Grooves 25 and 26 respectively are provided on the parts of the inner surface of the casing 3 that correspond to the suction side and to the delivery side respectively; these grooves interconnect the working spaces 20 and 22 respectively so that an equalization of pressure between the respective spaces may take place.

The above described change speed gear works as follows:

When the rotor 1 in Fig. 1 is rotated in the clockwise direction as indicated by the arrow A the pressure of the fluid is increased in the working spaces 20 in the manner known with rotary pumps. The fluid flows through the bores 7 into the working spaces 21 of the rotor 2 and causes the latter to turn also in the clockwise direction as indicated by the arrow B in Fig. 1. In the working spaces 22 of the rotor 1 a suction-pressure is generated so that the driving fluid flows from the spaces 23 of the rotor 2 into the spaces 22 of the rotor 1.

Fig. 2 shows the gear in which by a displacement of the casing 3 in the upward direction and relatively to the rotors the working spaces 20 and 22 of the rotor 1 are all of the same size, so that the rotation of the rotor 1 does not cause any flow of the fluid through the bores 7 and the rotor 2 is consequently at a standstill.

When the casing 3 is further displaced into the position indicated in Fig. 3, the rotation of rotor 1 in the clockwise direction (arrow A in Fig. 1) causes a generation of pressure in the working spaces 22 and thereby a flow of the fluid through the channels 7 into the spaces 23, whilst the fluid returns from the spaces 21 to the spaces 20, so that a rotation of the rotor 2 in the anti-clockwise direction is caused, as is indicated by the arrow C in Fig. 3.

Referring now to the constructional example illustrated in Figs. 4-7, 31 denotes the driving shaft which drives the inner rotor 40 by means of the gear wheels 32 and 33, the rotor 40 being rotatably mounted in roller bearings 35 and 36 and provided with radial slots 41 in which the vanes 42 are adapted to slide. The inner rotor 40 is surrounded by the outer rotor 50 which is rotatably mounted in the casing 37 and eccentrically to the rotor 40 by means of the roller bearings 45 and 46. The outer rotor 50 is provided with radial slots 51 in which the vanes 52 are adapted to slide. Channels 55 are arranged in the rotor 50 through which the working fluid may flow to and fro between the rotors. In the casing 37 which encloses both rotors equalizing channels 57 and 58 are arranged by which all the working spaces of both rotors in which pressure and suction respectively is generated are interconnected. The vanes 42 are guided in a concentric groove 44 provided in the rotor 50 and the vanes 52 are guided in a concentric groove 54 in the casing 37. The rotor 50 is further provided with a toothed rim 53 which is in mesh with a gear wheel 56 fixed to the driven shaft 60.

A gear wheel pump 63 driven by the gear wheels 32 and 62 serves for filling the change speed gear with working fluid and for replenishing the fluid lost by leakage. The pump 63 sucks the fluid from the casing 37 and forces it through a delivery channel 65. This channel is connected to the casing on both sides of the rotors by means of lateral passages 65ᵃ and 65ᵇ. Two pressure actuated valves 70 and 70' connected by a single valve-stem 70'' control these passages so that when one valve as 70 is closed by the pressure on one side of the gear, the other valve as 70' is automatically opened by the movement of the first named valve and automatically establishes a connection to the actual suction side of the gear. The two equalizing channels 57 and 58 are connected by channels to a safety valve 181.

The rotor 40 is mounted by means of the roller bearings 35 and 36 in two rocking levers 71 and 72, turnably arranged about fulcrum pins 74 and 75 fixed in the casing 37. The levers 71 and 72 are linked by means of tie-rods 76 and 77 to eccentric pins 78 and 79 of a shaft 80, so that a turning of the shaft 80 by manipulating the hand lever 73 causes an alteration of the eccentricity of the rotor 40 with regard to the rotor 50 and the casing 37.

In accordance with the position of the rotor 40 the latter pumps working fluid to one or the other side through the channels 55 into the working spaces of the rotor 50 and causes a turning motion of the latter in the one or the other direction, whilst the rotor 40 sucks the working fluid from the other side of the rotor 50 through the channels 55. When the eccentricity of the rotor 40 with regard to the rotor 50 is made equal to zero no pressure or delivery of the working fluid is caused and the change speed gear runs idle. With the maximum positive eccentricity between the two rotors the rotor 50 rotates ahead with the greatest speed, with the maximum negative eccentricity the rotor 50 rotates astern with the greatest speed and any intermediate speeds may be obtained by adjusting the eccentricity between the said maximum positive and the maximum negative amounts.

In the second constructional example illustrated in Figs. 8 and 9 the inner rotor 110 is directly connected to the driven shaft 101 and is rotatably mounted in the casing 170 by means of the roller bearings 105 and 106. The rotor 110 is provided with radial slots 111 and vanes 112 slidable in the former and is surrounded by the outer rotor 120 having slots 121 and vanes 122. The outer rotor 120 is rotatably mounted in the casing 170 in an eccentric position to the rotor 110 by means of the roller bearings 115 and 116. Channels 125 for connecting the working spaces of the two rotors and equalizing channels 127 and 128 are provided as in the first constructional example, the guide facings 114 and 117 in which the vanes 112 and 122 are laterally guided in order to effect their sliding movement in the radial direction are eccentrically arranged to the respective rotors. The rotation of the rotor 120 is derived from the driving shaft 130 through the interposition of the gear wheels 123 and 126. A gear-wheel pump 133 is further provided which delivers working fluid through a channel 135 and an automatic double seat valve 140 into the gear. Both rotors are enclosed in the casing 107 which is adapted to be displaced relatively to the rotors in order to alter the speed ratio between the driving and the driven shaft. To this end the casing 107 is provided with pin-shaped extensions 141 and 142 which are guided in bores provided in the outer casing 170 so that the casing 107 is lifted or lowered by means of hand lever 143, eccentric shaft 150 and link 146. Safety valves 151 are provided for preventing an excessive pressure rise within the gear.

The above described change speed gear is particularly well adapted for driving machine tools and lifting mechanisms of the various types; it requires little space, it is of a simple design and any speed within a wide range can be obtained by a simple adjustment of a hand-lever.

I claim:

1. In a fluid operated change speed gear, two eccentrically arranged rotors, a casing surrounding the rotors and eccentric to the outer rotor, said rotors and casing forming eccentric suction and pressure working spaces on opposite sides of the rotors and casing, channels in the outer rotor connecting the working spaces of the rotors, a fluid delivery channel adapted to communicate with the casing on opposite sides of the rotors, means for transferring the working fluid from the casing to the channel, means in the latter operable by pressure on the pressure side of the rotors for establishing communication between the channel and the suction side of the casing, and channels in the casing for equalizing the pressure in the working spaces.

2. In a fluid operated change speed gear, two eccentrically arranged rotors, a casing surrounding the rotors and eccentric to the outer rotor, said rotors and casing forming eccentric suction and pressure working spaces on opposite sides of the rotors, means to vary the relative eccentricity of the rotors and casing, channels in the outer rotor connecting the working spaces of the rotors, a fluid delivery channel adapted to communicate with the casing on opposite sides of the rotors, means for pumping the working fluid from the casing to the channel, and valves operable by the pressure on the pressure side of the rotors for establishing communication between the channel and the suction side of the casing.

3. In a fluid operated change speed gear, two eccentrically arranged rotors, a casing surrounding the rotors, and eccentric to the outer rotor, said rotors and casing forming eccentric suction and pressure working spaces on opposite sides of the rotors, means to vary the relative eccentricity of the rotors and casing, channels in the outer rotor connecting the working spaces of the rotors, a fluid delivery channel having lateral passages adapted to communicate with the casing on opposite sides of the rotor, and valves controlling the lateral passages and adapted to simultaneously close one passage and open the other, whereby the channel is placed in communication with the suction side of the rotors.

4. In a fluid operated change speed gear, two eccentrically arranged rotors, a casing surrounding the rotors and eccentric to the outer rotor, said rotors and casing forming eccentric suction and pressure working spaces on opposite sides of the rotors, means to vary the relative eccentricity of the rotors and casing, channels in the outer rotor connecting the working spaces of the rotors, a fluid delivery channel, a pump for transferring the working fluid from the casing to the channel, pump operating mechanism actuated by one of the rotors, passages connecting the channel with the casing on opposite sides of the rotor, a valve operable by pressure in the casing to close one of the passages, and a valve operable by the movement of the aforesaid valve to open the other passage whereby the channel is placed in communication with the suction side of the rotor.

5. In a fluid operated change speed gear, two eccentrically arranged rotors, a casing surrounding the rotors and eccentric to the outer rotor, said rotors and casing forming eccentric suction and pressure working spaces on opposite sides of the rotors, channels in the outer rotor connecting the working spaces of the rotors, channels in the casing for equalizing the pressure in the working spaces, and safety valves connected with the equalizing channels for preventing excessive pressure in the casing, a driving shaft operatively connected to one of the rotors, a driven shaft operatively connected to the other rotor, a fluid delivery channel communicating with the casing, a pump operatively connected with one of the rotors for transferring working fluid from the casing to the channel, laterally arranged passages communicating with the channel and connected with the casing on opposite sides of the rotor, and valves controlling the laterally arranged passages operable by pressure in the casing to simultaneously close one passage and open the other, whereby working fluid is supplied to the suction side of the rotors.

In testimony whereof I affix my signature.

HEINRICH SCHNEIDER.